United States Patent [19]

Geffrotin

[11] Patent Number: 5,146,499

[45] Date of Patent: Sep. 8, 1992

[54] DATA PROCESSING SYSTEM COMPRISING AUTHENTIFICATION MEANS VIZ A VIZ A SMART CARD, AN ELECTRONIC CIRCUIT FOR USE IN SUCH SYSTEM, AND A PROCEDURE FOR IMPLEMENTING SUCH AUTHENTIFICATION

[75] Inventor: Bernard Geffrotin, Meudon, France

[73] Assignee: U.S. Philips Corporation, New York, N.Y.

[21] Appl. No.: 604,711

[22] Filed: Oct. 22, 1990

[30] Foreign Application Priority Data

Oct. 27, 1989 [FR] France .................. 89 14144

[51] Int. Cl.⁵ .................................. H04K 1/00
[52] U.S. Cl. .................................. 380/23; 380/25; 235/380
[58] Field of Search .................. 380/23, 25; 235/380–382.5

[56] References Cited

U.S. PATENT DOCUMENTS

4,935,962 6/1990 Austin .................. 235/380
4,965,827 10/1990 McDonald .................. 380/23
5,068,894 11/1991 Hoppe .................. 380/25

*Primary Examiner*—Thomas H. Tarcza
*Assistant Examiner*—David Cain

[57] ABSTRACT

Authentication of a smart card is accomplished utilizing a microcomputer (PC) provided with an internal reader (RD) and an electronic circuit (3) linked to the PC. The circuit (3) includes a microprocessor (MP) capable of generating a random factor (RN). The circuit (3) also includes a startup circuit (MCD) generating a time delay period T, a security microcircuit (PSMC) and a blocking circuit (BBC). Between these elements, a cryptographic procedure, of the DES or DEA type, is effected which aims at establishing the consistency between a key (SK2I) associated with dedicated identity numbers (IN, OPN) of the smart card (CAM) and a key (SK2I') associated with a corresponding dedicated identity number (IN') of the PC in the PSMC. The system is automatically blocked in the case of inconsistency.

15 Claims, 3 Drawing Sheets

DATA PROCESSING SYSTEM COMPRISING AUTHENTIFICATION MEANS VIZ A VIZ A SMART CARD, AN ELECTRONIC CIRCUIT FOR USE IN SUCH SYSTEM, AND A PROCEDURE FOR IMPLEMENTING SUCH AUTHENTIFICATION

BACKGROUND OF THE INVENTION

1. Field of the Invention

The invention relates to a data processing system comprising a main bus, and an electronic circuit having authentification means for authentifying a smart card interfaceable thereto in an internal smart card reader, said authentification means being bidirectionally linked to said main bus and having a microprocessor means linked to said main bus and to said internal smart card reader.

The invention also relates to a procedure for implementing such authentification and to a circuit, packaged in an identifiable package, such as a printed circuit board or integrated circuit package, for interfacing to said main bus and executing said identification. The system may be in particular a stand-alone data processing system of moderate capability, such as a personal computer, personal microcomputer, or work station. For specific data processing capabilities of such system, reference is had to the common general knowledge.

The authentication consists in verifying, after power-up of such personal mircocomputer, PC or PS, during the start-up phase (boot) and in a non-falsifiable way, that the operator, holder of a memory card or smart card, is, by virtue of this card, properly authorized to work on this microcomputer.

2. Description of the Related Art

The securing of computer systems is a contant concern of the users of these systems but for a long time has been confined to restricting access to the computer centre premises and to protecting the computers against physical damage. The widespread use of microcomputers and the like has lent the security problem a new face. Such a personal microcomputer is very sensitive to fraudulent usage, such as, in particular, active attacks consisting in illicit copying, modification or destruction of files or of programs, or the introduction of computer viruses. This technical problem of protecting computing equipment has already existed with mainframes, but is greatly exacerbated by the advent of the PC; their number and their autonomy makes it impossible to supervize them effectively. Systems are known, with which the authentication of a microcomputer by memory card consists, after identification of the card-owner, following the recognition of the carrier code (CC) of the latter, in authenticating this card as authorizing the said owner to use the said microcomputer under certain conditions, by use of a "password" entered by the user and recognition by the microcomputer. This type of procedure, is however not very safe and inconvenient, because the "password" nedds frequent changing and may either have been improperly revealed to the (unauthorized) card-owner or be forgotten by the (authorized) card-owner. The security of computer systems can be greatly improved by the use of cryptographic techniques which allow, in particular, prevention of active attacks. The authentication is the means for an operator to prove that he is indeed he whom he has declared himself to be, as an authorized person, during the identification. In a cryptographic context, this proof implements a crytographic process between an authority, in particular a personal microcomputer, and the memory card representing the operator.

U.S. Pat. No. 4,612,413 describes a system of mutual authentication between a reader and a memory card using a specific nonstandard algorithm. The authentication process, which is complicated to implement, brings a level of security based on the use of four mathematical functions. A pseudo public key system is involved here, since the authentication is effected by means of two keys contained in the card, no key being present in the reader.

SUMMARY OF THE INVENTION

According to one aspect of the invention the problem is resolved differently and in a simpler fashion in that it is characterized in that said authentification means comprise pseudo random number (RN) generating means, a start-up detecting microcircuit (14) for detecting a start-up and thereupon generating a first control signal and a security microcircuit (PSMC) both connected to said microprocessor, and a main bus blocking circuit (BBC) connected to both said microprocessor and to said main bus, for during a delay period T initiated by said first control signal feeding said main bus with an unblocking signal, a combination of said microprocessor, said security microcircuit, said internal reader, a microprocessor-to-main-bus-interfacing circuit, and further data processing elements of said system having procedure effecting means for effecting a cryptographic authentification procedure based on a reversible algorithm (ALG, ALG−1) which makes use of said random number RN, for establishing in addition to the identification of a holder of the smart card, a consistency between a first key (SK2I) associated with dedicated identity numbers (NI, NOP) of the memory card and a second key (SK2I') associated with a corresponding dedicated identity number (NI') of the system in the security microcircuit, and in case of consistency between said first and second keys generating a second control signal, but in case of inconsistency between said first and second keys generating a third control signal, and said system having second detection means for exclusively under control of occurrence of said second control signal before determination of said delay period driving said bus blocking circuit to maintaining said bus unblocking signal, but under control of either said third control signal or occurrence of said termination having said bus blocking circuit thereupon initiating and maintaining a continuous bus blocking signal.

A secure boot phase for the personal microcomputer is thus obtained: the operator inserts his memory card into the reader integral to the microcomputer, then, after a conventional identification phase consisting in the verification of the carrier code CC of the operator, the authentication phase is automatically and non-falsifiably effected. The verification of the compatibility between the memory card and the microcomputer is made essentially by the said electronic circuit which may be an expansion board plugged into the microcomputer. The failure of the operation blocks the bus. The memory card contains a working zone where the dedicated identity number is located and an associated key for each microcomputer, stand-alone or belonging to a group, on which the card-owner is authorized to work.

A preferred embodiment of the invention is notable in that the said electronic circuit also comprises a read-only memory of the PC constituting part of the EPROM BIOS of the latter and bidirectionally linked to the said main bus. The BIOS (Basic Input Output System) constitutes part of the basic software of the microcomputer, such as, for example, keyboard reading and screen display, which software is indispensable to the functioning of the microcomputer. By locating part of the EPROM BIOS in the electronic circuit, the microcomputer is protected against an active physical attack which would consist, for a well-informed defrauder, in removing the expansion board from the microcomputer and thus preventing the blocking of the main bus by forcing bit(s) on one or more lines of the main bus to 1 or to 0.

According to another preferred embodiment of the invention, the said pseudo random number RN is generated and stored in RAM memory in the said PSMC after successive execution of the following steps in a specific program of the PSMC:

a—a logic operation, in particular the addition modulo 2 of the production key and of the transmitter key of the PSMC and the storage in RAM memory of the PSMC of the result of the addition, KIM: MK+IK=KIM b—the encoding in the said pseudo random number RN of a unique input message IM, generated by the PSMC, which is modified on each particular use of the latter, by means of a reversible algorithm (ALG, ALG−1) under the key KIM: RN=ALG$_{KIM}$(IM).

The security microcircuit (PSMC) is identical to the microcircuit of a memory card; in contrast, its mounting is different: the PSMC is encapsulated in a case whose connecting pins are soldered to the tracks of the electronic circuit. The fact that the PSMC itself generates pseudo random numbers RN and that the internally effects some of the cryptographic calculations followed by comparison of cryptograms confers on the authentication system an even greater degree of security and confidentiality.

The cryptographic procedure serving in the authentication may consist in the successive execution of the following steps by means of a specific program:

a—the transmission to the memory card of the pseudo random number RN generated by the PSMC or by the microprocessor, b—the encoding under the key SK2I, associated with the identity number IN of the memory card, of the pseudo random number RN, in the memory card: M1=ALG$_{SK2I}$(RN)

c — the transmission of the cryptogram M1 from the memory card to the PSMC, d—the decoding, in the PSMC, under the key SK2I', associated with the identity number IN' of the PSMC, of the cryptogram M1: RN'=ALG−1$_{SK2I'}$(M1)

e—the comparison of the numbers RN and RN', the equality of these numbers implying the equality between the keys SK2I and SK2I' associated with the identity numbers IN and IN' respectively and proving the authenticity of the memory card as well as the authorization of its owner to use the PC whose PSMC carries the identity number IN'.

The cryptographic procedure used for the implementation of the invention may be more elaborate so as to permit different identity numbers dedicated to the authentication in the PSMC, that is to say in the microcomputer, and in the memory card; this cryptographic procedure is notable in that it consists in the successive execution of the following steps by means of a specific program of the system:

a—the transmission to the memory card of the pseudo random number RN generated by the PSMC or by the microprocessor, b—the encoding, in the memory card, under the key SK2I associated with the identity number OPN and with the identity number IN of the memory card, of the pseudo random number RN: M1=ALG$_{SK2I}$(RN)

c—the transmission of the resulting cryptogram M1 of and of the identity number OPN from the memory card to the PSMC, d—the cryptographic calculation, in the PSMC, of a key deduced from the identity number OPN of the memory card: SKOP=ALG−1$_{SK2I'}$(OPN)

e—the decoding under the key SKOP, in the PSMC, of the cryptogram M1: RN'=ALG−1$_{SKOP}$(M1)

f—the comparison of the numbers RN and RN', the equality of these numbers implying consistency between the key SK2I associated with the identity numbers OPN and IN of the memory card and the key SK2I' associated with the identity number IN', and thus proving the authenticity of the memory card and the authorization of its owner to use the PC of identity number IN'.

According to this second cryptographic procedure, it is thus possible to assign to various cards which permit the use of such a microcomputer, to the identity number IN', having keys SK2I which differ from one another since they are associated with differing dedicated identity numbers OPN and differ from the verification key SK2I' in the PSMC, which improves the security of the system.

Various further advantageous aspects are that the delay period has a length of the order of a few seconds. For ergonomical reasons this is not too long, yet not too short as to allow an intruder to repeat the start up phase a great number of times, each time with a different trial data. Also, the bus blocking signal may be common to a plurality of bit wires of the main bus. This provides a simple interface. Advantageously, the bit blocking signal is a low impedance clamping signal to a particular bit value on any bus wire. This is a simple realization that does not need any electromechanical change to the bus. Advantageously, the system is provided with a UART means interconnecting said microprocessor to said main bus. This means only a moderate requirement for the number of available microprocessor data port pins. Moreover, such UART is a standard building block. This is in particular true when the UART interfaces to a second smart card reader unit. Such second smart card (or the first one transposed from the first to the second reader) represents an advantageous small-size peripheral for program and/or data storage. Various advantageous aspects of the invention are evident from dependent Claims as well as from the disclosure.

BRIEF DESCRIPTION OF THE DRAWINGS

The description which follows in regard to the attached drawings, all given by way of example, will improve understanding of how the invention may be effected.

DETAILED DESCRIPTION OF THE PREFERRED EMBODIMENTS

Figure 1:
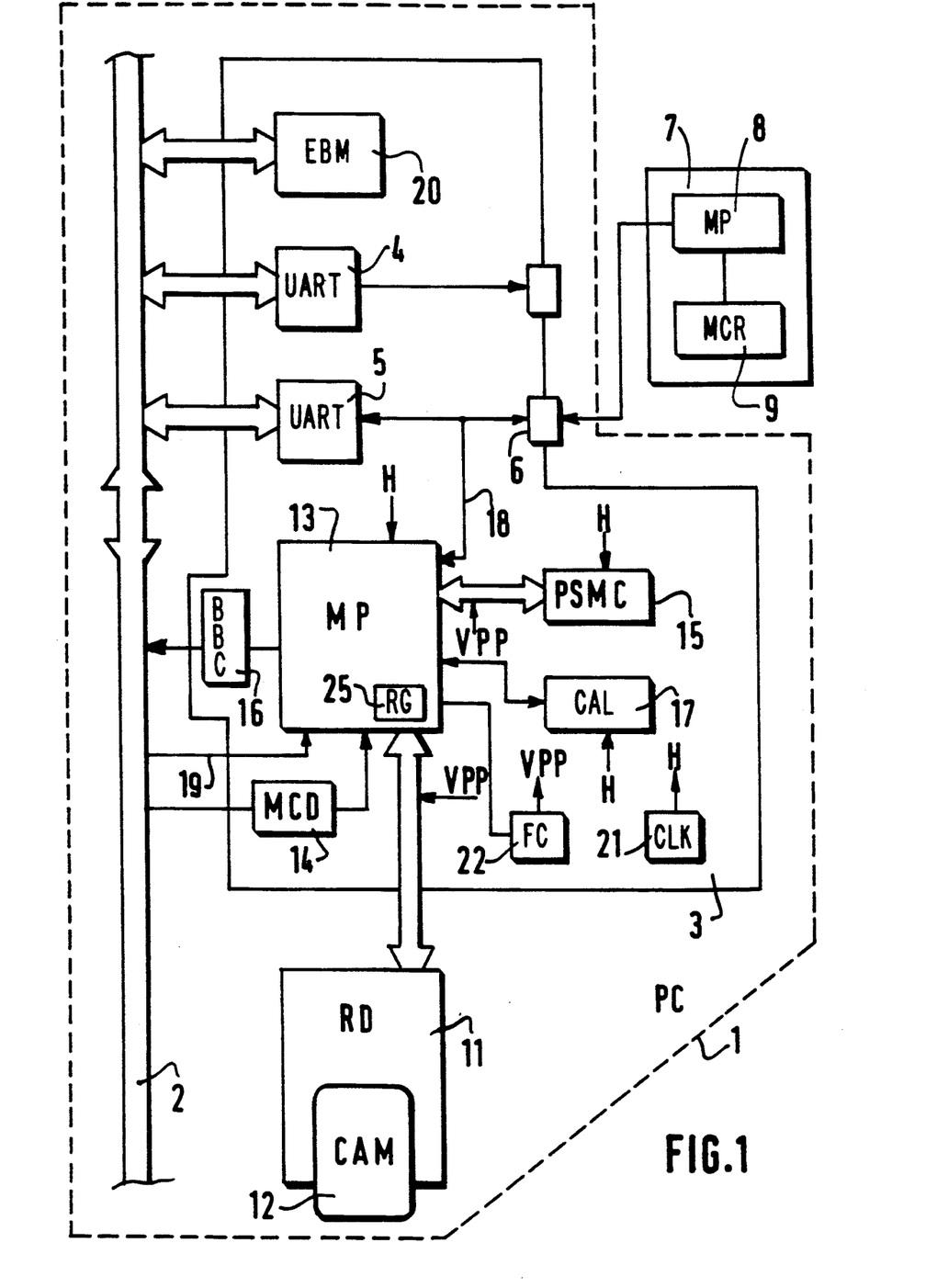
FIG. 1 is a synoptic diagram of the authentication system according to the invention.

FIG. 1 represents symbolically, inside a dashed line 1, a personal microcomputer of the PC or PS type, designated by PC in the text which follows. This PC comprises a main bus 2 which is constituted by the data, address and control lines. Moreover, the PC comprises an electronic circuit 3 in the form of an expansion board plugged into the PC. In a known manner, the board 3 is provided with input-output ports such as UART 4, 5 which ensure the connection between the PC and local or remote peripherals. For example, the UART 5 is linked through an interface 6, which performs a V28/V24 connection conversion, to a remote reader unit 7 which comprises a microprocessor 8 and a memory card reader 9. According to the invention, the electronic circuit 3 also cooperates with a memory card reader internal to the PC (RD). This local reader, labelled 11, may be integrated with the PC, for example at the site of a diskette unit. The reader 11 is designed to receive a memory card (CAM) 12 with the aims of authentication and, more particularly, firstly to verify if the carrier of the card 12 is indeed the real owner of it (identification) and subsequently to verify if the card 12 permits access to the PC and its use, possibly conditional, in part by means of secret data and of a specific program contained in the card (authentication). For the cooperation between the circuit 3 and the card 12, the circuit 3 comprises a microprocessor 13, a start-up microcircuit 14 (MCD) (boot), a security microcircuit 15 (PSMC), a main bus blocking circuit 16 (BBC) and, possibly, a calendar 17. The PSMC, the reader 11 and the calendar 17 are bidirectionally linked to the microprocessor 13, the latter, which also comprises a bidirectional connection 18 to the UART 5 and the interface 6, receiving control signals coming from the bus 2 on a conductor 19 (reset) and start-up signals coming from the bus 2 via the start-up microcircuit 14 and being able to transmit blocking signals for the bus 2, via circuit 16, by forcing one or more control lines of the bus 2 to 1 or 0. According to a particular embodiment of the invention which is described further on, the electronic circuit 3 comprises part of the EPROM BIOS memory of the PC, labelled 20 and bidirectionally linked to the bus 2. A clock generator 21 sends a time base signal H to the microprocessor 13, to the PSMC 15 and to the calendar 17; a feed circuit 22 sends a programming voltage signal PVS to the buses which connect the microprocessor to the PSMC and to the internal reader 11 respectively. This feed circuit is controlled by the microprocessor 13.

The microprocessor 13 and/or the PSMC 15 is (are) capable of generating successing pseudo random numbers RN intended, in a generally known manner, to be used in cryptographic processes to make secure the use of the PC. Preferably, it is the PSMC itself, by dint of its role in ensuring the security functions, which comprises means for generating the pseudo random numbers RN as described further on. The start-up microcircuit SUM, 14, as well as its known function which consists in loading the main software of the electronic circuit 3, is designed to trigger a time delay, of period T, of the order of a few seconds just after power-up of the PC and the reinitialization signal (RESET) on the conductor 19, the main bus 2 being maintained unblocked during said period. During the time T, a conventional identification procedure of the carrier of the memory card 12, followed, according to the invention, by an automatic cryptographic authentication procedure, if the preceding identification procedure is successful, must have concluded successfully for the bus 2 to be maintained in the unblocked state, that is to say in practical terms for the single or multiple output conductor of the blocking circuit 16 to be maintained in a state of high impedance. If the procedures in question are not completed at the end of the interval T or if at least one terminated with a false result, the microprocessor 13, via the blocking circuit 16, causes one or more of the conductors of the main bus 2 to be forced to the value "1" or to the value "0". All of the aforementioned procedures are effected by means of cryptographic techniques which process, inter alia, at each authentication request, a pseudo random number RN and proceed under the control of a specific program shared by the card 12, the reader 11, the microprocessor 13, the PSMC 15 and the PC7. The automatic authentication procedure, described further on, aims at establishing consistency between a key associated with the identity numbers of the operator OPN and identity number IN of the authorized PC and contained in the memory card, and a key associated with the identity number IN' contained in the PSMC. A secret key is associated with each identity number, said secret key being denoted SK2I for IN and OPN and SK2I' for IN'. A relationship exists between SK2I', OPN and SK2I such that the knowledge of SK2I' permits the calculation of SK2I from the identity number OPN but such that the knowledge of SK2I does not permit calculation of the key SK2I'. According to a first variant of the authentication procedure, the result to be obtained is the equality between the keys SK2I and SK2I'. According to a second more elaborate variant, the result to be obtained is the cryptographic consistency between the keys SK2I and SK2I', by verification of the validity of the key SK2I being able to be associated with the key SKOP derived from the secret key SK2I of the PSMC.

For the aforementioned cryptographic procedure, the reversible encryption algorithm employed, generally denoted ALG for the encoding and ALG−1 for the decoding, is preferably the secret key encoding system known as: Data Encryption Standard (denoted DES for its encoding function and DES−1 for it decoding function) described in the publication "Federal Information Processing Standards Publication" (FIPS PUB 46) of Jan. 15th, 1977 of the National Bureau of Standards of the American Ministry of Commerce. This algorithm is, of course, present in the memory card 12 to execute the cryptographic functions and protect the data (see on this subject the French Patent 2,611,962 in the name of the Applicant); it is also present in the PSMC 15.

Figure 2:
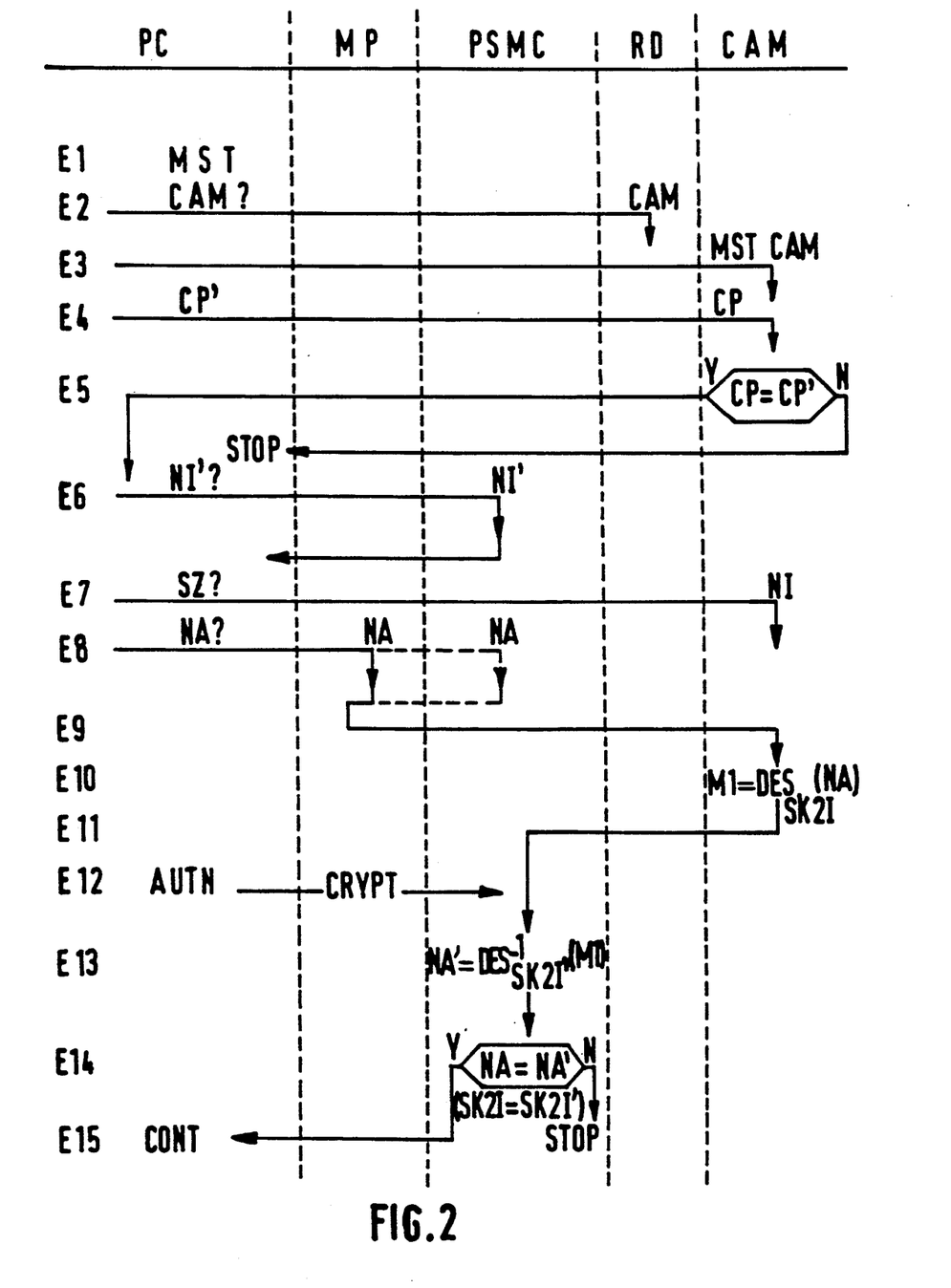
FIG. 2 is the diagram of an authentication process of a memory card by a personal microcomputer according to the invention.

FIG. 2 shows the successive steps E1 to E15 of a first authentication procedure which technically characterize the invention, the authentication procedure proper commencing at stage E6. The main elements which are involved in the procedure have been shown at the top of FIG. 2, using the same identifiers as in FIG. 1, these elements being: the PC 1, the microprocessor MP 13, the PSMC 15, the internal reader RD 11 and the memory card MC 12. In the course of the procedure, information passes in one or other direction on the various buses and, in particular, along the conductor 18 and the UART 5, in a manner well known to the average computer scientist.

At step E1 the PC is powered-up (PUP). If after the detection of start-up and the beginning of the time delay T in the start-up circuit SUM 14 the system software has correctly booted, the PC gives a message to the operator that he must insert his card MC into the reader RD (step E2). At step E3 the card, after insertion, is drawn inside the reader entirely under the action of a motor, the card is powered-up (PUP MC) and parameters unique to the card are transmitted to the microprocessor MP (not shown). At step E4 for the identification procedure, the operator keys-in, on request by the PC, on the keyboard of the latter, the confidential carrier code CC' which identifies the card as belonging exclusively to him. At step E5, the carrier code CC actually contained in the card is compared, in the card, with the code CC' which has just been keyed-in. In the case of a difference (N) between the two aforementioned carrier codes CC and CC', the STOP message signifies that the procedure has been stopped, the card returned to the operator and that the procedure must be restarted at step E1. In the case of three consecutive incorrect presentations of the carrier code, the system blocks and the card is retained inside the reader RD. If on the other hand the two carrier codes are identical (Y), the procedure continues through steps E6 to E15, without further operator intervention, this constituting the authentication procedure proper aimed at automatically and non-falsiviably verifying the compatibility between the MC and the PC. In E6 the PC interrogates the PSMC to obtain from it the identification number IN', associated with the secret key SK2I' and reserved for its authentication. In step E7 an operation similar to the preceding one is effected between the PC and the card: a number IN, equal to IN' and associated with the secret key SK2I, is sought in the working zone of the EPROM or E2PROM data memory of the MC. Next, in step E8, the PC sends a message to the microprocessor MP (or to the PSMC) requesting generation of a pseudo random number (RN?). We suppose for the moment that it is the microprocessor which supplies the number RN and which comprises, for this purpose, a random number generator of a known type (represented by 25 in FIG. 1). In step E9 the number RN is available in MP and it is transmitted to the card and in the present case, to the PSMC. In E10 the number RN is encoded, under the key SK2I:

$$M_1 = DES_{SK2I}(RN)$$

The resulting cryptogram $M_1$ is then transmitted, in E11, from the card to the PSMC. In step E12 a message requesting authentication (AUTN), in the form of a decoding of $M_1$ (CRYPT), is sent by the PC to the PSMC. This decoding is effected, in step E13, in the PSMC:

$$RN' = DES^{-1}{}_{SK2I'}(M_1)$$

In step E14 a test of equality between the number RN and the cryptogram RN' is effected in the PSMC. In the case of a difference between RN and RN' (N) the system blocks (STOP), that is to say the microprocessor 13 acts on the main bus 2 via the blocking circuit 16. In the case of equality: RN=RN' (Y) the procedure continues with step E15, by which the PSMC indicates to the microprocessor and to the PC that the usage of the PC by the operator may take place. In practice, this is brought about by maintaining, beyond the period T, the blocking circuit 16 output conductors in a state of high impedance. The equality of the numbers RN and RN' implies that the card MC and the PSMC have in common the secret keys SK2I and SK2I', identical in the two microcircuits, and hence that the card is indeed authentic in the sense of: authorizing the use of the PC.

In practice, most frequently, several operators are authorized to use the same PC and in order to be able to effect the procedure according to FIG. 2, they each possess a memory card in which the working zone contains the identity number IN, equal to IN', and the associated secret key SK2I, identical to the key SK2I' of the PSMC. Now, it may be awkward that several operators have, in their card, the same identity number associated with the same secret key, for the authentication, this secret key being in this case the same as that of the PSMC (that is to say, of the PC). There is then a risk, admittedly quite small, that an operator might reconstruct, following a fraudulent decoding, the secret key of the PSMC, and also the risk that one operator might pass himself off for another. To avoid these drawbacks, it is advantageous to implement an authentication procedure, more elaborate than that of FIG. 2, based on the principle that the memory card of each authorized operator does not contain the key SK2I of the PSMC but a key derived from this key by encryption, the keys of the various cards, as well as the corresponding identification numbers, then differing from one another.

Figure 3:
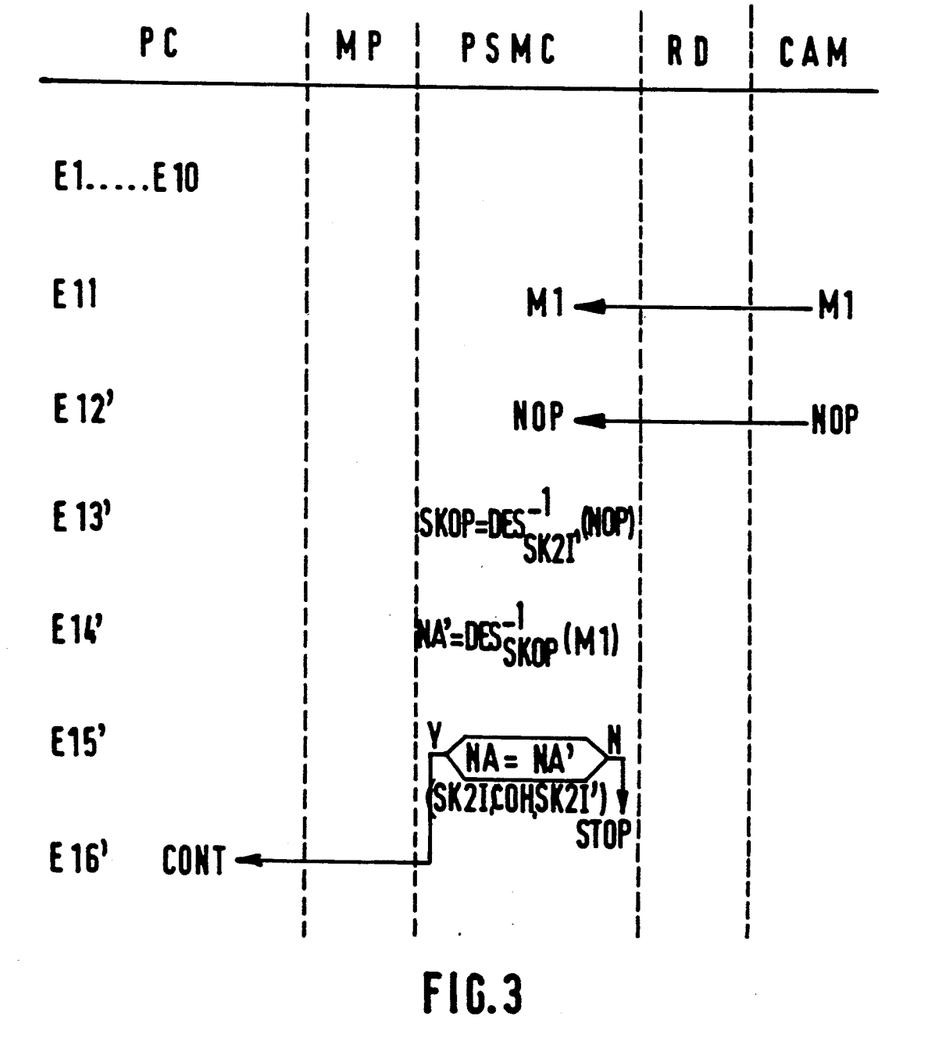
FIG. 3 is the diagram of a more elaborate variant of the authentication process of FIG. 2.

FIG. 3 shows this more elaborate procedure according to which the initial steps E1 to E11 are the same as in FIG. 2, except that in step E7, one among the various possible numbers OPN is sought in the card.

In step E11, the cryptogram $M_1$ is transmitted from the card to the PSMC; in step E12', the dedicated identification number of the card, labelled OPN, is also transmitted from the card to the PSMC. Step E13' consists in the encryption (decoding) in the PSMC of the number OPN under the key SK2I' of the PSMC:

$$SKOP = DES^{-1}{}_{SK2I'}(OPN)$$

In step E14', the cryptogram SKOP, which must in fact be the key of the card associated with the identity number OPN, is used for the decoding, in the PSMC, of the crytogram $M_1$ (see step E10, FIG. 2):

$$RN' = DES^{31}\,1_{SKOP}(M_1)$$

The resulting cryptogram, RN' ought to be equal to the pseudo random number RN, which condition is tested in step E15', which is similar to step E14 of FIG. 2. In the present case, equality (Y) implies a consistency or compatibility, through the expedient of a cryptographic technique, between the keys SK2I of the card and SK2I' of the PSMC and not the equality of these keys. In step E16, the outcomes of the test (Y or N) are the same as in step E15 of FIG. 2.

For the authentication procedures described above, it has been assumed that the pseudo random number RN was generated by the microprocessor MP. For increased confidentiality, it is advantageous that this number RN be generated by the PSMC itself, for example in the manner described below.

The structure of the PSMC, well known to those skilled in the art, is not shown in the drawings. We merely recall the main elements of this structure, necessary for understanding the generation of pseudo-random numbers. The microcircuit of the PSMC comprises an 8 bit microprocessor which itself includes a random access memory RAM. Two other random access memories (RAM buffer) are each linked to the microprocessor, by a bidirectional address bus and a data bus respectively, and are configured to form a buffer for a ROM program memory and a data memory of EPROM type, the ROM and the EPROM being arranged in parallel. The EPROM memory is intended to receive data such as, in particular, keys, and is arranged so as to be neither erasable nor rewritable, that is to say, so as to function like a PROM. The EPROM includes presentation keys or master keys and numeric keys. Amongst the presentation keys the following may be singled out, in particular: a manufacturing key MK inserted by the manufacturer at the prepersonalization phase and which is known only to the manufacturer, and an issuer key IK inserted at the personalization phase by the card issuing body, known as "the issuer", for example a bank, and which is known only to the issuer. The key MK protects the card against unauthorized personalization; it is generated from a manufacturer's card batch.

The EPROM memory also comprises a serial number SN which has the characteristics of being readable on the case of the PSMC, hence non-confidential, and unique to each PSMC.

The sought aim is to generate simply by means of a specific program contained in the ROM program memory, a pseudo random number RN referred to as unique number. For this, three means are employed: the first means consists in combining in RAM memory of the microprocessor of the PSMC the two keys MK and IK by effecting a logic operation between them, preferably exclusive OR bit by bit addition (addition modulo 2):

$$MK + IK = KIM$$

(MK, IK and KIM comprising the same number of bits, for example 64).

The key KIM, which can be neither removed from the microcircuit nor altered from outside and is therefore unknown to anybody, is thus obtained.

According to the second means, the key KIM is combined with a message (number) IM generated by the card, referred to as input message, which has the main characteristic of being unique, through being modified at each specific usage, and which can be neither removed from the microcircuit nor altered from outside. This combining consists in the encoding by a reversible algorithm ALG, $ALG^{-1}$, under the key KIM, of the message IM:

$$ALG_{KIM}(ME) = RN$$

RN: unique number (pseudo random).

Preferably, the reversible encryption algorithm employed is the well known secret key encoding system, referred to as "Data Encryption Standard" (DES, $DES^{-1}$) to which a reference is already made above, or "Data Encryption Algorithm" (DEA, $DEA^{-1}$).

The third means employed for the unique number RN generation procedure consists in the primarily step of generation of the input message IM. This message IM must possess the following characteristics: it must be different for each power-up, be independent of the time at which it is requested and be itself a unique number, that is to say be usable only once, never repeating. Among numerous solutions which are within the scope of those skilled in the art for the generation of the number IM according to the aforementioned criteria, the following solution is preferably chosen, which implies the creation of a RAM register in the RAM memory, for example included in the microprocessor of the PSMC and whose loadstate is designated by LSRAM, and of a PROM register in the PROM data memory and whose loadstate is designated by LSROM; the input message IM is constructed from three juxtaposed elements, going from highest significance to lowest significance, which are:

the serial number of the PSMC SN, which is unique in that it allows differentiation of one PSMC from all the others, and which is inserted at the prepersonalization phase (by the manufacturer), LSRAM, incremented on each unique number RN generation, the RAM register 18 being initialized to 0 0 ... 0 on each power-up of the PSMC or on each clearance (RESET), LSROM, incremented after each power-up or clearance (RESET), if the RAM register overflows. The input message IM therefore takes the form: SN, LSRAM, LSROM.

The incrementation (by one or more units) of the RAM register at each pseudo random number RN generation ensures that the input message IM varies from one particular usage of the PSMC to the next usage, the microcircuit of the PSMC being assumed under power. The sought aim being that identical sequences of consecutive values of the number IM cannot be produced and given that LSRAM periodically retakes the value zero, the incrementation (by one or more units) of the PROM register, in particular during power-up, enables this repetition of undesirable identical sequences to be avoided.

Moreover, if a defrauder tries to exhaust the computational possibilities of the RAM register by making the PSMC systematically generate successive numbers RN without disconnection or clearance of the microcircuit, when the RAM register returns to zero after overflow, following several tens of thousands of attempts, a sequence of numbers IM different to that corresponding to the earlier attempts appears because of the incrementation of the PROM register during the RAM overflow. In this way, it is impossible for anyone to anticipate and hence to generate from outside the microcircuit of the PSMC a number RN identical to a number RN already generated by the PSMC, during a particular usage of the latter for the purposes of authentication, which prevents any possibility of fraud.

The embodiments of the invention described above aim to protect the PC against a fraudulent usage based on non-physical operations. It will be noted, however, that it would be possible for a well-informed and determined defrauder to deconfigure (remove) the electronic circuit board 3 of the PC in order to prevent the blocking of the main bus 2 by forcing particular conductors to a particular logic value via the blocking circuit 16. According to a variant of the invention, it is possible to ward off such physical attacks by inserting part of the basic software of the PC, contained in a PROM and represented by 20 in FIG. 1, into the board 3. This basic software, referred to as BIOS, which serves, in particular, for keyboard reading and screen display, it indispensable to the functioning of the PC.

In conjunction with the authentication procedure proper, the specific program of the card can be adapted to effect further checks regarding the rights of usage of the operator, such as:

user time-slots linked to the days of the week, these slots being regulated by the calendar 17 (FIG. 1), privileges such as, for example, the authorization to print or to copy onto diskette.

Just as it is possible for several people to access a given PC as described above, the inverse operation, compatible with the first, can easily be effected just by using the procedures already described. To allow one person to access several PC's forming a group, for maintenance reasons for example, it is sufficient to allocate to each of these PC's a common group identity number associated with a common group key, each PC being able to retain, moreover, its associated individual identity number and key. Correspondingly, the person authorized to use all the PC's of the group possesses a memory card which comprises a group identity number of the type IN (first procedure) or of the type OPN (second procedure) associated with a key SK2I or SK0P respectively, these data being in their turn compatible with similar data allocated to such or such other PC, individually.

The invention is not strictly limited to the authentication of a microcircuit card by a personal computer but can be carried over, at a more general level, to the authentication of a first item of computer hardware of the microcircuit card type by a second item of computer hardware, in particular the authentication of a personal microcomputer provided with a security microcircuit by a server (or a host computer) in a network environment, as explained below and with the following aim:

In a network environment, it is important to ensure not only that the operator is authorized to use a workstation, that is to say a personal microcomputer (invention strictly speaking), and authorized to use a server application (known conventional function of known conventional authentication of the memory card of the operator by the server), but equally that the operator is working from a microcomputer from which access to said server is authorized.

This last condition is particularly difficult to guarantee, above all in the most frequent situation where the connections are made by using the switched telephone network and frequently an authentication of the operator by the server is taken to be sufficient. The risk incurred in this case is of fraud effected by an operator authorized from outside the company where the server is located.

The invention provides with an elegant solution to this technical problem exactly similar to that indicated at the beginning of the description. To effect the authentication of the PC by the server, according to the invention, the PSMC must take on the functions of the MC and the server those of the PSMC. The PSMC must be initialized with one (or more) extra working zones reserved for authentications by the servers. Keys SKA in the PSMC and SKA' in the server are created, which are the counterpart of the keys SK2I and SK2I' respectively, as well as an identity number PCN in the server for each authorized PC, a pseudo random number is generated in the server and an authentication process similar to that of FIG. 3 permits authentication of the PC by the server. IF the two pseudo random numbers obtained in the server are equal, the communication between PC and server is maintained; if not, this communication is cut there and then. The keys SKA and SKA' are different. A relationship exists between the keys SKA and SKA' such that SKA may be calculated from SKA' and from PCN. On the other hand, the knowledge of SKA does not allow calculation of SKA'.

I claim:

1. A data processing system comprising
    a) microprocessor means (MP) interfaced to an internal smart card reader (RD) and to a security microcircuit (PSMC);
    b) a main bus (2);
    c) further data processing means connnected via said main bus to said microprocessor means, for cooperatively under control of a random number (RN) and a reversible algorithm (ALG) from said system authentifying a smart card (CAM) presented to said reader, by means of a first key (SK21) generated from first identity quantities (NI, NOP) from said card and an associated second key (SK21') generated from a second identity quantity (NI') from the security microcircuit, an authentification represented by correspondence among said first and second keys resulting in a correspondence signal;
    d) a start-up detection circuit (MCD) for detecting an initiation of said authentifying and thereupon generating a first control signal to said microprocessor means;
    e) a main bus blocking circuit (BBC) fed by said microprocessor means and further connected to said bus for under control of said first control signal generating a bus-unblocking signal of predetermined duration; and
    f) wherein absence of said correspondence signal before end of said duration drives said blocking circuit to generating and maintaining a continuous bus blocking signal.

2. A system as claimed in claim 1, wherein said duration is in the order of seconds.

3. A system as claimed in claim 1, wherein said bus blocking signal is common to a plurality of bit wires of said main bus.

4. A system as claimed in claim 1, wherein said bus blocking signal is a low impedance clamping signal to a particular bit value on any bus wire.

5. A system as claimed in claim 1, provided with a UART means interconnecting said microprocessor to said main bus.

6. A system as claimed in claim 5, wherein said UART interfaces to a second smart card reader unit.

7. A system as claimed in claim 1, characterized in that said further data processing means also comprises a read-only memory constituting part of the EPROM BIOS memory of the system and being bidirectionally linked to the main bus.

8. A system as claimed in claim 1, characterized in that said microprocessor comprises said pseudo random number generator means.

9. A method for authentifying a smart card using a security microcircuit (PSMC) characterized in that a pseudo random number RN is generated and stored in RAM memory in said PSMC after successful execution of the following steps in a specific program by the PSMC:

a performing an addition modulo 2 of a production key MK and of an issuer's key IK of the PSMC and storing in RAM memory of the PSMC a result of the addition, KIM: MK+IK=KIM b encoding by means of the pseudo random number RN, generated by the PSMC, of a unique input message IM, which message is modified on each particular use of the PSMC, by means of a reversible algorithm (ALG, ALG$^{-1}$) under a key KIM: RN=ALG$_{KIM}$(IM).

10. A cryptographic procedure for authentifying a memory card using a security microcircuit (PSMC) and a microprocessor, characterized in that the procedure comprises a successive execution of the following steps by means of a specific program:

a generating a pseudo random number RN and transmitting the random number to the memory card, b encoding under a key SK2I, associated with an identity number IN of the memory card, the pseudo random number RN, in the memory card creating crytogram M1: M1=ALG$_{SK2I}$(RN), c transmitting the cryptogram M1 from the memory card to the PSMC, d decoding, in the PSMC, under a key SK2I', associated with an identity number IN' of the PSMC, the cryptogram M1 creating number RN': RN'=ALG$-1_{SK2I'}$(M1), e comparing the numbers RN and RN' of above steps a and d, an equality of these numbers implying the equality between the keys SK2I and SK2I' associated with the identity numbers IN and IN' respectively.

11. A cryptographic procedure for authentifying a memory card using a security microcircuit (PSMC) and a microprocessor, characterized in that the procedure comprises a successive execution of the following steps by means of a specific program:

a generating a pseudo random number RN and transmitting the random number to the memory card, b encoding, in the memory card, under a key SK2I associated with an identity number OPN and with an identity number IN of the memory card, the pseudo random number RN, resulting in a cryptogram M1: M1=ALG$_{SK2I}$(RN), c transmitting the resulting cryptogram M1 and the identity number OPN from the memory card to the PSMC, d calculating, in the PSMC, a key SKOP deduced from the identity number OPN of the memory card: SKOP=ALG$^{-1}{}_{SK2I'}$(OPN), e decoding under the key SKOP, in the PSMC, the cryptogram M1, resulting in number RN': RN'=ALG$=1_{SKOP}$(M1), f comparing the numbers RN and RN', an equality of these numbers implying consistency between the key SK2I associated with the identity numbers OPN and IN of the memory card and the key SK2I' associated with the identity number IN' of the PSMC.

12. The procedure of claim 10 wherein step "a" comprises generating the random number by the PSMC.

13. The procedure of claim 11 wherein step "a" comprises generating the random number by the PSMC.

14. The procedure of claim 10 wherein step "a" comprises generating the random number by the microprocessor.

15. The procedure of claim 11 wherein step "a" comprises generating the random number by the microprocessor.

* * * * *